United States Patent
Koehler

(10) Patent No.: US 6,301,658 B1
(45) Date of Patent: Oct. 9, 2001

(54) METHOD AND SYSTEM FOR AUTHENTICATING DIGITAL CERTIFICATES ISSUED BY AN AUTHENTICATION HIERARCHY

(75) Inventor: Stephen C. Koehler, Mahtomedi, MN (US)

(73) Assignee: Secure Computing Corporation, Roseville, MI (US)

(*) Notice: Subject to any disclaimer, the term of this patent is extended or adjusted under 35 U.S.C. 154(b) by 0 days.

(21) Appl. No.: 09/150,260

(22) Filed: Sep. 9, 1998

(51) Int. Cl.[7] .................................................. G06F 1/24
(52) U.S. Cl. .................. 713/155; 713/156; 713/169; 380/255; 380/277; 380/278
(58) Field of Search .................................. 380/255, 277, 380/278, 279; 713/155, 156, 158, 169, 175

(56) References Cited

PUBLICATIONS

Schneier, "Applied Cryptography", 1995, pp. 38, 39.*
"Using RSA Public Key Cryptography for Internet Security", http://wwww64.netscape.com/newsref/ref/rsa.html, pp. 1–7, (1998).
Clayton, R., "How public key cryptography works", http://www.happyday.demon.co.uk./keys.htm, 1 page, (Mar. 4, 1998).
Elgamal, T., et al., "Securing Communications on the Intranet and Over the Internet", *Securing Communications White Paper*, http://wwww68.netscape.com/newsref/ref/128bit.html, pp. 1–22, (Jul. 1996).

* cited by examiner

*Primary Examiner*—Thomas R. Peeso
(74) *Attorney, Agent, or Firm*—Schwegman, Lundberg, Woessner & Kluth, P.A.

(57) ABSTRACT

A method and system for efficiently authenticating digital certificates issued by an organization's authentication hierarchy. The system includes a verification server that manages a certificate repository and a verification cache having entries for verified digital certificates and certification revocation lists. Each cache entry includes a corresponding timestamp that indicates when the item was last authenticated. The verification server incrementally updates the verification cache using a recursive procedure to traverse the hierarchy's chain of authority signatures. The procedure performs costly verifications of digital signatures and scans of certification revocation lists only when an item's timestamp is out of date with respect to its issuer's digital certificate, certification revocation list or other security information.

23 Claims, 4 Drawing Sheets

METHOD AND SYSTEM FOR AUTHENTICATING DIGITAL CERTIFICATES ISSUED BY AN AUTHENTICATION HIERARCHY

FIELD OF THE INVENTION

This invention relates generally to the field of secure computing environments, and more particularly to a method and system for authenticating digital certificates issued by an organization having a hierarchy of certification authorities.

BACKGROUND

There are many challenges to creating a highly secure computing environment such as preventing eavesdroppers from accessing private communications, preventing vandals from tampering with information while in transit from sender to receiver, authenticating users logging into a network, verifying a network server is indeed the server it professes to be and safeguarding confidential documents from unauthorized individuals. A variety of standards have been developed in order to address these challenges including Secure Sockets Layer (SSL), Secure Electronic Transactions (SET) and Secure Multipart Internet Mail Encoding (S/MIME). These standards are rooted on a common technology: cryptography.

In cryptography, a sender transforms data into an unreadable form, known as encrypting the data, and transmits the data to a receiver, thereby ensuring privacy. The receiver transforms the encrypted information back to readable form by decrypting the data. A commonly employed approach, known as symmetric-key cryptography, uses a single "key" to encrypt and decrypt messages. This approach allows two parties to carry out bidirectional communication using a single key, each party encrypting and decrypting information with the same key. Symmetric-key cryptography, however, suffers from several basic problems. First, the key itself must be securely communicated to other party. Second, each party must trust the other party to adequately safeguard the key. Third, symmetric-key cryptography lacks scalability, i.e., a unique key must be secretly maintained for each communication channel. In other words, if a user wishes to independently communicate with several other individuals, the user must maintain a secret key for each individual, otherwise the individuals could easily snoop on the communications to each other. Thus, symmetric-key cryptography may be a viable option for small networks but quickly becomes inadequate and unwieldy as the number of communication channels proliferates.

Due to the disadvantages of symmetric-key cryptography, many of the current standards mentioned above rely on a different technique known as public key cryptography. Unlike symmetric-key cryptography, public key cryptography uses a pair of asymmetric keys, one for encryption and one for decryption. Each key performs a one-way transformation upon the data. When information is encrypted using one of the keys, it can only be decrypted using the other key. Furthermore, it is computationally impractical, if not impossible, to determine one of the keys based on the other.

In public key cryptography, one of the keys is widely publicized and is known as the public key. The other key, known as the private key, is maintained secretly. To send a secure message, a sender encrypts the message using the recipient's public key and transmits the message to the receiver. The message can be decrypted by the private key known only to the recipient. Thus, public key cryptography does not have the scalability problem of symmetric-key cryptography. Furthermore, public key cryptography does not require the secure communication of a key itself and the receiver need not trust any other party with maintaining a secret key.

An interesting feature of public key cryptography is that a sender can "digitally sign" an outgoing communication by simply reversing the process. For example, a transmission that is encrypted with the sender's private key can only be decrypted using the sender's public key. Thus, the receiver can trust that the communication came from the claimed place of origin if the communication is successfully decrypted using the public key of the place of origin. Because the public key of the claimed sender was used to verify the "digital signature" of the sender, the information must have be encrypted by the sender's private key known only to the sender.

Even though public key cryptography has several advantages over symmetric-key cryptography, encrypting and authenticating digital signatures relies on the validity of the public key. For example, if the public key is maintained in a common repository, a recipient can rely on the authentication of a communication only to the extent that the recipient can rely on the repository. Furthermore, a sender typically attaches its public key to an outgoing communication so the recipient need not retrieve the sender's public key from the repository. Therefore, it is entirely possible for an imposter to encrypt information with their own private key, pretend to be a different sender and attach their own public key to the communication. In order to solve this problem, standards have defined "digital certificates", also known as public-key certificates, that are issued by trusted authorities such as a network administrator or even the government. A digital certificate is used to establish the authenticity of a public key.

A digital certificate typically contains: (1) a name identifying the owner of the certificate, (2) the owner's public key that is to be authenticated, (3) a name identifying the authority that issued the certificate, (4) the certificate authority's digital signature, (5) a validity period and (6) a serial number generated by the certificate authority. Under this approach, the sender of a message attaches its digital certificate to the communication. The recipient of the message uses the certificate to verify that the sender's public key is indeed authentic. This is accomplished by first verifying the certificate authority's digital signature that is encapsulated within the certificate. If the authority's digital signature proves authentic, the recipient can trust the certificate and can authenticate the message using the sender's public key encrypted within the certificate. In this manner, only the public key for the issuing authority need be implicitly trusted.

One advantage of using digital certificates is that a large-scale organization can establish an authentication hierarchy that corresponds to the organization's hierarchical structure, thereby facilitating public key registration and certification. For example, a large corporation may establish an authentication hierarchy having a central group responsible for issuing corporate certificates. The central group may issue certificates to various groups, divisions or business units within the organization such that each group issues certificates to sub-groups, network administrators or individual users. For example, employees working on a marketing team may receive certificates issued by the marketing division. These certificates are authenticated by the marketing division's certificate and a corporate certificate. In this manner, each level of the hierarchy has its own private key and a corresponding digital certificate issued by its parent for authenticating the public key.

Authentication hierarchies provide a highly secure environment, accommodate diverse security groups and allow the issuance and maintenance of certificates to be distributed across the organization. One disadvantage of an authentication hierarchy, however, is that a receiver must authenticate the digital certificates attached to a message in order to fully verify the authenticity of the message. In large organizations, the authentication hierarchy may have many levels, thus requiring many verifications of digital signatures. Verifying a digital signature is computationally intensive and requires calculation and manipulation of very large integers. Furthermore, each authority may promulgate a certificate revocation list (CRL) listing those certificates which have been revoked and are no longer to be trusted. Revocation may occur when a private key is compromised to the public, when an the organization restructures or when an employee is fired. Thus, a receiver must not only authenticate each digital certificate with its issuer, it must verify that the none of the attached certificates have been revoked or expired. For these reasons, many security systems attempt to minimize the impact of the authentication process by primitive caching schemes. For example, some systems only authenticate certificates that have not been authenticated recently, such as within the past twenty four hours. This scheme has the advantages of simplicity and efficiency but is not very secure. Other more sophisticated systems cache the expiration periods for individual items, such as certificates and CRLs, that have been authenticated. When an expired item is replaced by the issuing authority, these systems remove the old item and authenticate the new item as well as all dependent material. This technique is advantageous in the cache is guaranteed to be accurate, but suffers from large computational hits when a certificate or CRL expires or is revoked.

For the reasons stated above, and for other reasons stated below which will become apparent to those skilled in the art upon reading and understanding the present specification, there is a need in the art for a verification system which can efficiently authenticate digital certificates issued by an organization having a hierarchy of certification authorities.

SUMMARY OF THE INVENTION

As explained in detail below, the present invention is directed to a method and system for authenticating digital certificates issued by an authentication hierarchy.

In one embodiment, the invention is a method for authenticating a user digital certificate issued by a certification authority (CA) belonging to a hierarchy of certification authorities (CA's) having a root CA. Each CA of the hierarchy except the root CA has a corresponding digital certificate from a parent CA of the hierarchy. According to the method, a cache is provided that maintains entries for previously authenticated digital certificates. Each entry has a timestamp indicating when the corresponding digital certificate was authenticated. The hierarchy of CA's is traversed to determine a chain of parent CA's from the CA that issued the user digital certificate to the root CA. Finally, the user digital certificate is marked as authentic as a function of the timestamp of the cache entry for the user digital certificate and the timestamps of the cache entries for the digital certificates of each CA of the determined chain.

According to one feature of the invention, the digital signature of the user digital certificate is authenticated when a timestamp of the respective cache entry is older than a timestamp of the issuing CA. The timestamp of the cache entry for the user digital certificate is updated once the digital signature of the user digital certificate is authenticated.

According to another aspect of the invention, the cache has entries for certificate revocation lists (CRL's). A CRL published by the CA issuing the user digital certificate is searched when a timestamp of a cache entry for the CRL of the issuing CA is more recent than the timestamp of the cache entry for the user digital certificate.

In another embodiment, the invention is a system for authenticating a user digital certificate issued by a certification authority (CA) belonging to a hierarchy of certification authorities (CA's) having a root CA. Each CA of the hierarchy except the root CA has a corresponding digital certificate from a parent CA of the hierarchy. The system comprises a verification cache having a plurality of cache entries such that each cache entry corresponds to a digital certificate. Furthermore, each cache entry has a timestamp indicating when a digital signature of the corresponding digital certificate was authenticated. A verification server authenticates the user digital certificate as a function of the timestamp of the cache entry for the user digital certificate and timestamps of cache entries for each CA of a chain of parent CA's linking the issuing CA to the root CA.

In another embodiment, the invention is a method for maintaining a cache having entries for previously authenticated digital certificates issued by a certification authority (CA) belonging to a hierarchy of CA's, wherein each CA of the hierarchy except a root CA has a corresponding digital certificate issued by a parent CA of the hierarchy. According to the method, a digital signature of the digital certificate of one of the CA's is authenticated when a timestamp of the corresponding cache entry is older than a timestamp of the cache entry for the digital certificate of the corresponding parent CA. The timestamp of the cache entry for the authenticated digital certificate is updated when the digital signature is authenticated. In one embodiment, the cache maintains cache entries for certificate revocation lists (CRL's). In this embodiment, a CRL published by the corresponding parent CA is searched when a timestamp of a cache entry for the CRL is more recent than the timestamp of the cache entry for the digital certificate of the CA to be authenticated.

These and other features and advantages of the invention will become apparent from the following description of the preferred embodiments of the invention.

DETAILED DESCRIPTION

In the following detailed description, references are made to the accompanying drawings that illustrate specific embodiments in which the invention may be practiced. Electrical, mechanical, programmatic and structural changes may be made to the embodiments without departing from the spirit and scope of the present invention. The following detailed description is, therefore, not to be taken in a limiting sense and the scope of the present invention is defined by the appended claims and their equivalents.

Figure 1:
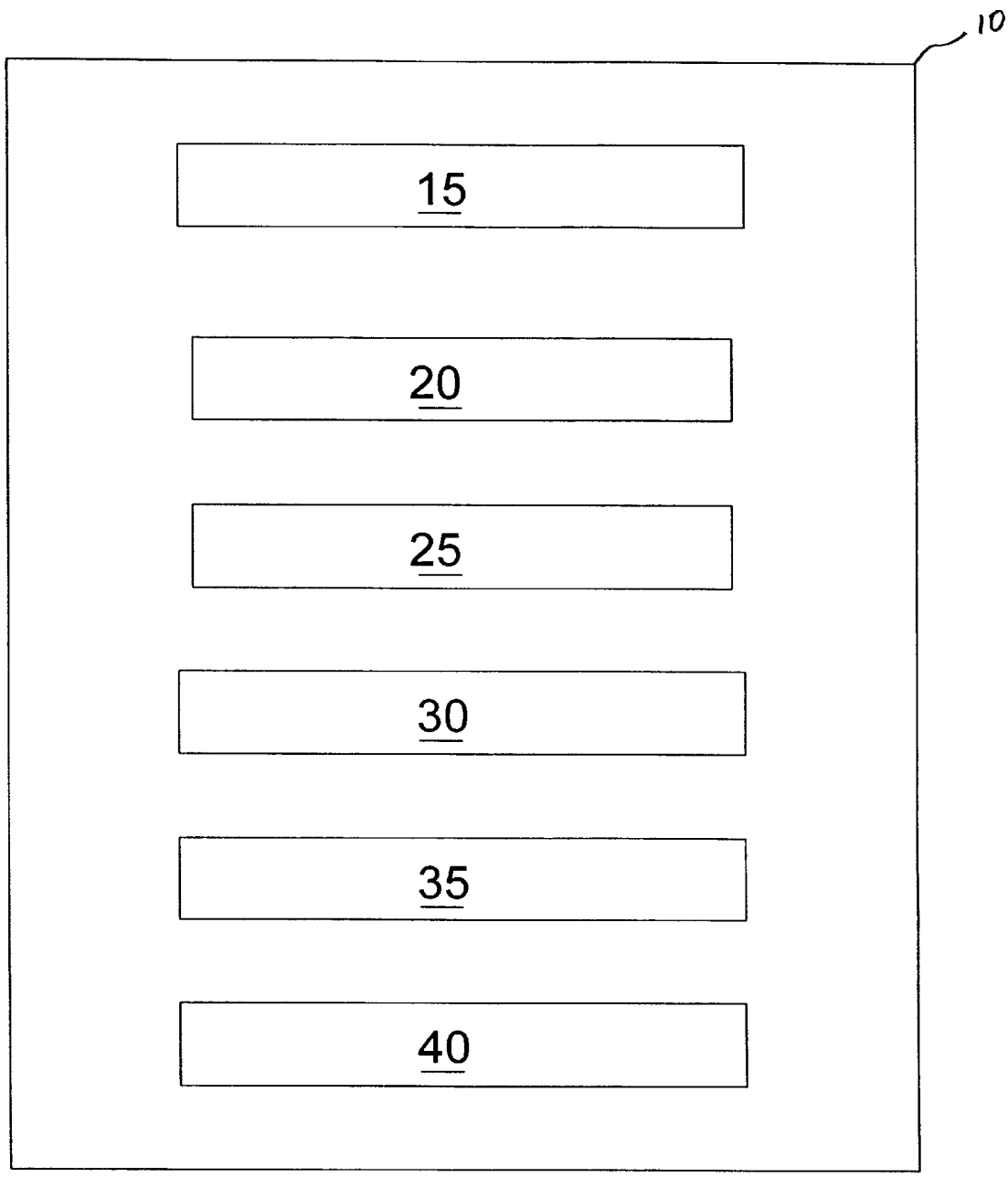
FIG. 1 illustrates a conventional digital certificate.

FIG. 1 illustrates a typical digital certificate 10 having six data fields including owner information 15, the owner's public key 20, validity period 25, serial number 30, issuer information 35 and issuer's digital signature 40. Owner information 15 identifies the owner of digital certificate 10 and typically includes information such as the owner's name, address and organization. Public key 20 is the owner's public key that can be used to authenticate any message sent by the owner. Certificate 10 is used to establish the authenticity of the owner's public key 20. Validity period 25 typically defines a period of time for which certificate 10 is valid. Certificate 10 is considered expired beyond validity period 25 in which case public key 20 may no longer be used to authenticate messages. Serial number 30 is a unique number generated by a certification authority (CA) and is used to identify certificate 10. CA information 35 identifies the certification authority that issued certificate 10. For example, CA information 35 may identify a particular group or branch within an organization. CA digital signature 40 is the digital signature of the issuing certificate authority and is used to verify that certificate 10 is authentic and indeed issued by the authority identified in CA information 35.

Authenticating digital certificate 10 is a time consuming and computationally intensive process. In order for certificate 10 to be valid, several intensive checks must be performed: (1) validity period 10 must be examined, (2) the issuers certificate revocation list (CRL) must be scanned for serial number 30 to ensure that certificate 10 has not been revoked, (3) CA digital signature 40 must be validated with the issuer's public key to ensure that CA digital signature 40 is authentic, (4) the digital signature on the issuer's CRL must be authenticated to ensure that it corresponds to the issuer of certificate 10. This process is further complicated if the owner of certificate 10 belongs to a large organization having a hierarchy of certification authorities. If authenticate certificate 10 has been issued by an authentication hierarchy, its signing chain must be traced and verified up to the organization's central authority. The above enumerated checks must be performed on issuer certificates at each level of the authentication hierarchy. Considering that in a secure environment each user, document and electronic mail must be authenticated, this process becomes extremely burdensome for large organizations.

Figure 2:
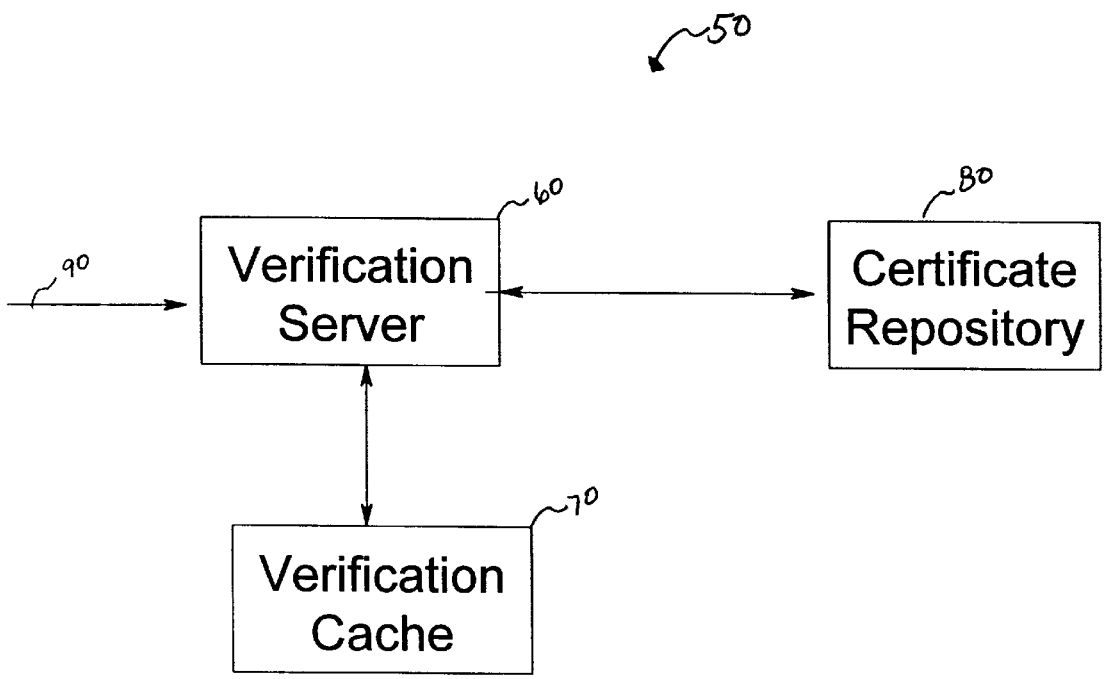
FIG. 2 is a block diagram of a system for authenticating digital certificates in accordance with the present invention.

FIG. 2 illustrates a verification system 50 for authenticating digital certificates issued by a hierarchy of certification authorities. Verification system 50 is shown in block diagram form and includes verification server 60, verification cache 70 and certificate repository 80. Verification server 60 receives verification requests 90 from a plurality of clients (not shown). A client may be any application or device that uses public key cryptography and requires authentication of a digital certificate. Examples of such applications include an electronic mail application, a mail transfer agent, a web browser, a user authentication server and an encrypting firewall. Verification server 60 receives each client request 90 and responds whether a particular digital certificate is authentic. In one embodiment, verification server 60 is a client process that serves multiple client processes on a single machine. In another embodiment, verification server 60 resides on a network server and servers clients distributed across a network. Certificate repository 80 maintains all digital certificates issued by the authentication hierarchy and in one embodiment is a X.500 directory of digital certificates.

In order to reduce the computational demands incurred when authenticating a digital certificate, verification server 60 maintains verification cache 70. More specifically, verification server 60 creates a cache entry for each authenticated digital certificate or CRL. Each cache entry contains a timestamp indicating when the item was verified. Based on timestamps of related items, verification server 60 determines whether an item is currently valid. Verification cache 70 is organized for efficient lookup of an item and, in one embodiment, is organized by owner and information type. In another embodiment, each cache entry has a corresponding data file for storing information such as the item's timestamp, expiration data, issuer and user privileges.

Figure 3:
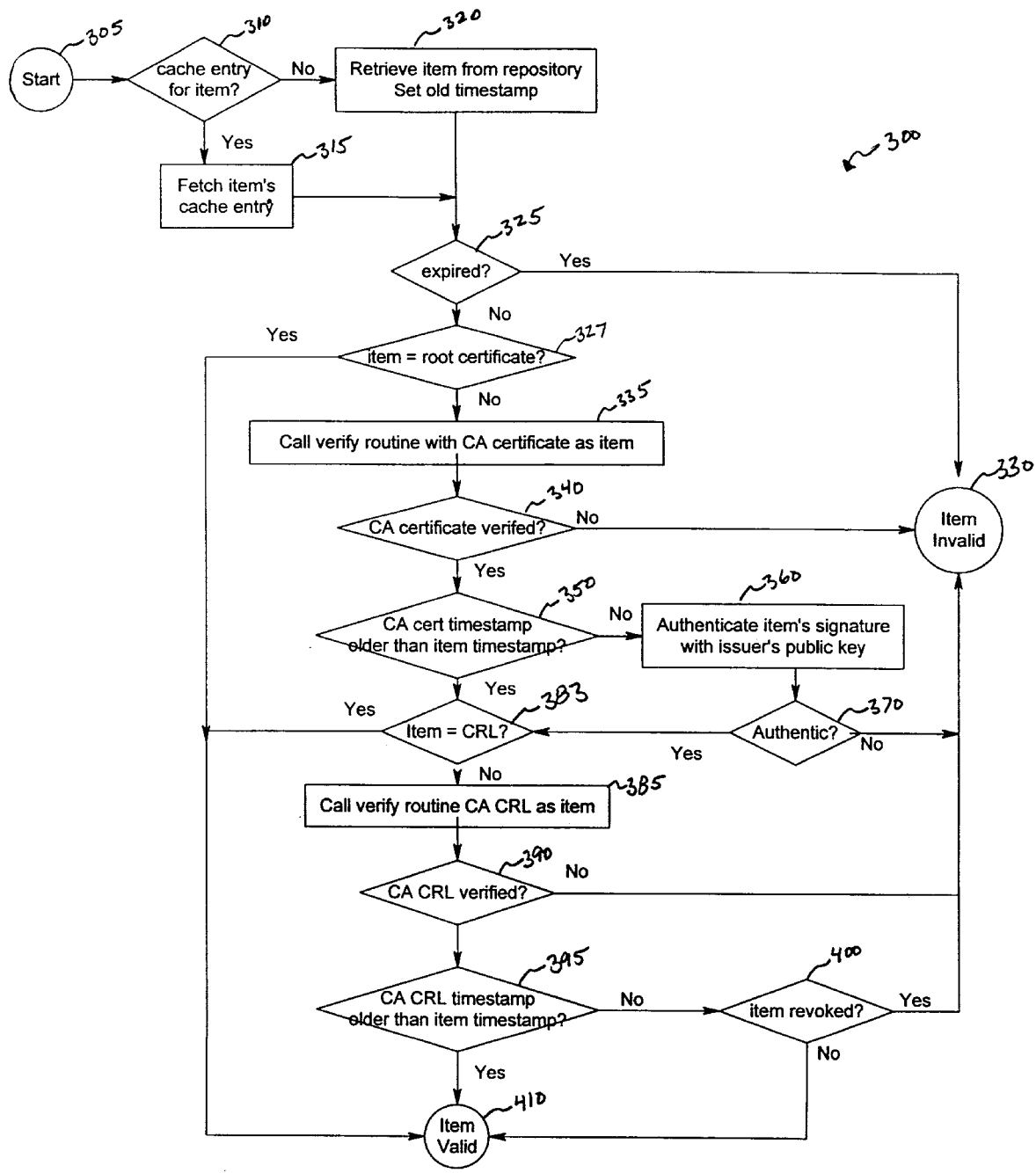
FIG. 3 is a flow chart illustrating one mode of operation of a digital certificate verification system for authenticating digital certificates issued by a multilevel authentication hierarchy.

FIG. 3 is a flow chart illustrating one embodiment of verification routine 300 authenticating a particular item, such as a digital certificate or a CRL, in accordance with the present invention. In order to verify a particular item, verification server 60 (FIG. 1) begins with step 305 and immediately proceeds to step 310 to determine whether a cache entry exists for the item being authenticated. If an entry exists, verification server proceeds to step 315 and immediately fetches the item's cache entry. If a cache entry does not exist, verification server proceeds from step 310 to step 320 and retrieves the item from certificate repository 80. Upon retrieving the item, verification server 60 creates a cache entry in verification cache 70 and sets the newly created entry's timestamp to an uninitialized state. For example, in one embodiment, verification server 60 sets the timestamp to a date older than any entry in the cache such as Jan. 1, 1900. In this manner, as will be illustrated below, verification server 60 forces the authentication of the newly retrieved item.

Verification server 60 proceeds from either step 315 or step 320 to step 325 and determines whether the expiration date of the retrieved item has passed. If the item has expired, verification server 60 jumps to step 330, issues a response to client request 50 that the item is invalid and terminates the authentication process. If the item has not expired, verification server 60 proceeds to step 327 and determines whether the item corresponds to the root CA of the hierarchy. If so, verification server 60 jumps to step 410 and terminates the recursion of verification subroutine 300 by marking the item as valid. If not, verification server proceeds to step 335 and retrieves a digital certificate of the certification authority (CA) that issued the item being authenticated. If the CA certificate has a cache entry then verification server 60 retrieves the cache entry. If no entry exits, verification server 60 retrieves the CA certificate from certificate repository 80, creates a cache entry and sets its verified timestamp to an uninitialized state. After retrieving the CA certificate, verification server 60 authenticates the CA certificate by recursively calling verification subroutine 300 with the CA certificate as the item to be authenticated. In other words, in step 335 verification server 60 invokes a second instance of verification subroutine 300 in order to authenticate the retrieved CA certificate. In this manner, subroutine 300 authenticates the CA certificate by recursively tracing the signing chain up through the authentication hierarchy and by authenticating each certificate along the chain.

Upon returning from the recursive execution of subroutine 300 in step 335, verification server 60 proceeds to step 340 and checks whether the CA certificate was authentic or whether it was rejected. If the CA certificate was invalid, then verification server 60 jumps to step 330 and responds to client request 50 that the original item is invalid because its certification authority is invalid. If the CA certificate was authenticated by the recursive call, verification server 60 proceeds to step 350 and determines whether the current item's timestamp is more recent than the timestamp of the CA certificate. A more recent timestamp than the CA certificate indicates that the item has been authenticated more recently than the CA certificate. In this sense, the item is not "out of date" and its digital signature need not be authenticated. If the item's timestamp is out of date, i.e. older than the timestamp of the CA certificate, then verification server 60 proceeds from step 350 to step 360 and authenticates the item's digital signature using the public key stored with the CA certificate. If the digital signature of the items proves authentic, verification server 60 proceeds from step 370 to step 383. If the digital signature of the item is invalid, verification server 60 jumps to step 330 and rejects the item as invalid.

If the item's timestamp is not out of date, verification server 60 proceeds from step 350 to step 383 and determines whether the item being validated is a CRL if so, verification subroutine 300 jumps to step 410 and marks the item as valid. If the item is not a CRL, then verification server 60 proceeds to step 385 where it retrieves a certificate revocation list (CRL) for the item's issuer. If the CA CRL has a cache entry then verification server 60 fetches the cache entry. If no entry exits, verification server 60 retrieves the CA CRL from repository 80, creates a cache entry and sets its verified timestamp to an uninitialized state. After retrieving the CA CRL, verification server 60 authenticates the CA CRL by recursively calling verification subroutine 300 with the CA CRL as the item to be authenticated. Thus, as in step 325, verification server 60 invokes another instance of subroutine 300 in order to authenticate the retrieved CA CRL. In this manner, subroutine 300 authenticates the CA CRL by recursively tracing the signing chain up through the authentication hierarchy to ensure the CA CRL was validly issued. In one embodiment, during the recursion the invention advantageously determines whether the item to be verified is a CRL and skips steps 327, 335 and 340 by jumping from step 325 to step 350, thereby avoiding a redundant verification of the CA certificate.

Upon returning from the recursive execution of subroutine 300 in step 385, verification server 60 proceeds to step 390 and checks whether the CA CRL was authenticated. If the CA CRL was invalid, then verification server 60 jumps to step 330 and responds to client request 50 that the original item is invalid. If the CA CRL was authenticated by the recursive call, verification server 60 proceeds to step 395 and determines whether the current item's timestamp is more recent than the timestamp of the CA CRL. A more recent timestamp than the CA CRL indicates that the item has been authenticated more recently than the CA certificate and the CRL need not be searched to determine whether the item has been revoked. If the item's timestamp is out of date then verification server 60 proceeds to step 400 and searches the CRL for the item's serial number. If the item has been revoked, verification server 60 jumps to step 330 and returns that the item is not valid. If the item has not been revoked, verification server 60 proceeds to step 410. In step 410, verification server 60 updates the timestamp of the item's cache entry if the items signature was authenticated in step 360, the item was not revoked in step 400 or if the item is a root certificate and the root's timestamp has not been previously set. Finally, in step 410, verification server 60 responds that the current item is indeed authentic and valid.

As illustrated above, verification server 60 traces an item's signing authority by recursively executing subroutine 300. Furthermore, computationally intensive verifications of digital signatures and time-consuming scans of CRLs are only executed if an item is out of date with respect to its issuer. In this manner, if an item has been authenticated more recently than its issuer, it is not authenticated again.

Figure 4:
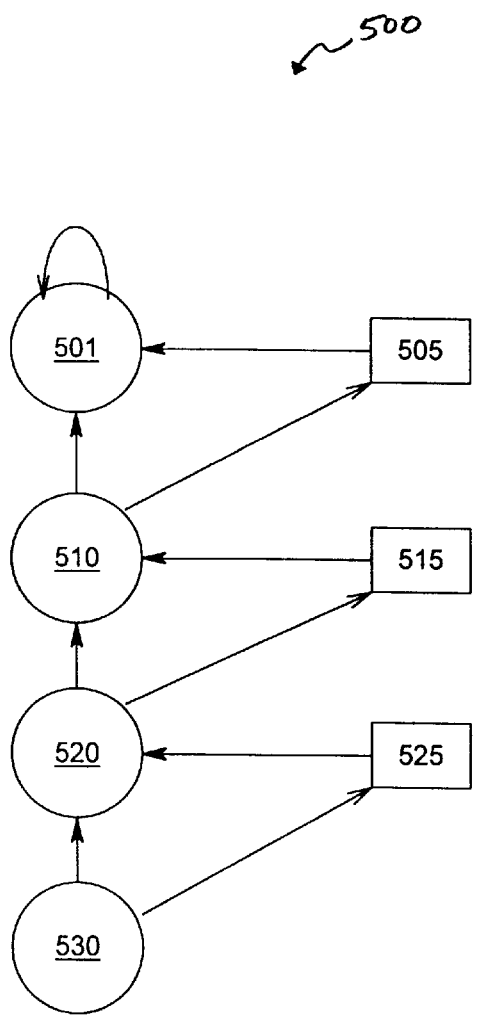
FIG. 4 is a block diagram illustrating authentication dependencies for each level of an authentication hierarchy.

FIG. 4 illustrates one embodiment of an authentication hierarchy 500 having a three levels certification authorities.

The arrows of FIG. 4 illustrate dependencies between each level. Root authority 501 maintains a private key for hierarchy 500 and is the ultimate authority in hierarchy 500. Root authority 501 issues a digital certificate for each subordinate authority such as certification authority 510. In this respect, root authority is the parent to certification authority 510. Certification authority 510 in turn issues digital certificates to subordinate authorities including certification authority 520. Thus, root authority 501 is superior to certification authority 510 and certification authority 520, while certification authority 510 is considered the parent of certification authority 520. Finally, certification authority 520 issues digital certificates to its subordinate users including user 530. Each level of authentication hierarchy 500 has a unique private key and its own digital certificate encapsulating its public key. In addition, each of certification authority 501, 510 and 520 issues a corresponding certification revocation list (CRL) 505, 515 and 525, respectively, which enumerate revoked digital certificates of users, subordinate certification authorities and certification revocation lists.

As described above, whether a particular CRL or a CA certificate of FIG. 4 needs to be fully authenticated has numerous dependencies as indicated by the interconnecting arrows. For example, whether the digital signature of the digital certificate belonging to user 530 needs to be checked depends on the timestamp of its cache entry in relation to the timestamp of a cache entry for CA 520. Whether CRL 525 needs to be searched for the digital certificate of user 530 depends upon the timestamp of the cache entry for user 530 in relation to the timestamp of the cache entry for CRL 525. Similarly, whether the certificate of CA 520 needs to be fully authenticated depends and the timestamps of cache entries for CA 510 and CRL 515. These relationships continue up to root authority 501 which can easily be easily verified based on its well known public key.

In one embodiment, the authentication of a particular level of authentication hierarchy 500 is dependent upon information generated when superior levels are authenticated. Thus, each cache entry of verification cache 80 maintains information generated the digital signatures of superior certification authorities are authenticated. In this embodiment, verification server 60 authenticates each certification authority using a corresponding public key and the cached information.

Referring again to FIG. 2, verification server 60 incrementally updates (reauthenticates) entries in verification cache 70 according to the dependencies described in FIG. 4. Thus, at any point in time the cache entries in verification cache 70 may not all be valid. When an item is invalid, such as when a certificate expires or a certification authority has issued a new CRL, dependent items are reauthenticated only as necessary. By incrementally updating only those entries in verification cache 70 that are necessary to satisfy client requests 90, verification server 60 reduces the number of unnecessary and time consuming verifications of digital signature, scans of CRLs and accesses of certificate repository 80.

Various embodiments of an authentication system have been described which efficiently authenticate digital certificates issued by an authentication hierarchy. The system includes a verification server that manages a certificate repository and a verification cache having verification timestamps indicating when an item was last authenticated. The verification server incrementally updates entries in the verification cache using a recursive procedure to traverse an item's authority chain. Several advantages of the present invention have been illustrated including reduction of costly verifications of digital signatures and scans of certification revocation lists. Furthermore, the present invention is easily adapted to various forms of security information that need to be authenticated. This application is intended to cover any adaptations or variations of the present invention. It is manifestly intended that this invention be limited only by the claims and equivalents thereof.

I claim:

1. A method for authenticating a user digital certificate issued by a certification authority (CA) belonging to a hierarchy of certification authorities (CA's) having a root CA, wherein each CA of the hierarchy except the root CA has a corresponding digital certificate from a parent CA of the hierarchy, the method comprising the steps of:
    providing a cache having entries for previously authenticated digital certificates, wherein each entry has a timestamp;
    traversing the hierarchy of CA's to determine a chain of parent CA's from the CA that issued the user digital certificate to the root CA; and
    marking the user digital certificate as authentic as a function of timestamp of a cache entry for the user digital certificate and the timestamps of cache entries for digital certificates of each CA of the determined chain.

2. The method of claim 1, wherein the marking step includes the steps of:
    authenticating the digital signature of the user digital certificate when a timestamp of the respective cache entry is older than a timestamp of the issuing CA; and
    updating the timestamp of the cache entry for the user digital certificate when the digital signature of the user digital certificate is authenticated.

3. The method of claim 2, wherein the marking step includes the steps of:
    authenticating the digital signature of the digital certificate of each CA of the determined chain when a timestamp of the corresponding cache entry is older than a timestamp of the cache entry for the corresponding parent CA; and
    updating the timestamp of the corresponding cache entry of each CA of the determined chain when the digital signature of the digital certificate of each CA is authenticated.

4. The method of claim 2, wherein the authenticating step includes the step of verifying the digital signature of the user digital certificate using a corresponding public key.

5. The method of claim 3, wherein the authenticating step includes verifying the digital signature of each CA of the determined chain using a corresponding public key.

6. The method of claim 1, wherein the verification cache has entries for certificate revocation lists (CRL's), and further wherein the marking step includes searching a CRL published by the CA issuing the user digital certificate when a timestamp of a cache entry for the CRL of the issuing CA is more recent than the timestamp of the cache entry for the user digital certificate.

7. The method of claim 1, wherein the verification cache has entries for certificate revocation lists (CRL's), and further wherein the marking step includes searching a CRL published by the corresponding parent CA of each CA of the determined chain when a timestamp of a cache entry for the CRL is more recent than the timestamp of the cached entry for the digital certificate of the CA.

8. A system for authenticating a user digital certificate issued by a certification authority (CA) belonging to a hierarchy of certification authorities (CA's) having a root CA, wherein each CA of the hierarchy except the root CA has a corresponding digital certificate from a parent CA of the hierarchy, the system comprising:
    a verification cache having a plurality of cache entries, wherein each cache entry corresponds to a digital certificate, and further wherein each cache entry has a timestamp indicating when a digital signature of the corresponding digital certificate was authenticated; and
    a verification server for authenticating the user digital certificate based on a comparison of the timestamp of a cache entry for the user digital certificate with timestamps of cache entries for each CA of a chain of parent CA's linking the issuing CA to the root CA.

9. The system of claim 8, wherein the verification server authenticates the digital signature of the user digital certificate when a timestamp of the respective cache entry is older than a timestamp of the issuing CA.

10. The system of claim 9, wherein the verification server authenticates the digital signature of the digital certificate of each CA of the chain when a timestamp of the corresponding cache entry is older than a timestamp of the cache entry for the corresponding parent CA.

11. The system of claim 9, wherein the verification server verifies the digital signature of the user digital certificate using a corresponding public key.

12. The system of claim 10, wherein the verification server verifies the digital signature of each CA of the determined chain using a corresponding public key.

13. The system of claim 8, wherein the verification cache has entries for certificate revocation lists (CRL's), and further wherein the verification server searches a CRL published by the CA issuing the user digital certificate when a timestamp of a cache entry for the CRL is more recent than the timestamp of the cache entry for the user digital certificate.

14. The system of claim 8, wherein the cache has entries for certificate revocation lists (CRL's), and further wherein the verification server searches a CRL published by the corresponding parent CA of each CA of the chain when a timestamp of a cache entry for the CRL is more recent than the timestamp of the cached entry for the digital certificate of the CA of the chain.

15. A system for processing client requests to authenticate user digital certificates issued by a certification authority (CA) of a hierarchy of certification authorities (CA's) having a root CA, wherein each CA of the hierarchy except the root CA has a corresponding digital certificate from a parent CA of the hierarchy, the system comprising:
    a verification cache having a plurality of cache entries, wherein each cache entry corresponds to a verified digital certificate, and further wherein each cache entry has a timestamp indicating when a digital signature of the corresponding digital certificate was authenticated; and
    a verification server executing a software program for performing the steps of:
        accessing the verification cache to retrieve a cache entry for a digital certificate of the CA issuing the user digital certificate;
        authenticating the digital certificate of the issuing CA as a function of cache entries for each CA of a chain of parent CA's from the issuing CA to the root CA;
        updating the timestamp of the cache entry for the digital certificate of the issuing CA when the digital certificate of the issuing CA is authenticated; and
        responding that the user digital certificate is authentic when the timestamp of the cache entry for the user digital certificate is more recent than the timestamp of the cache entry corresponding to the digital certificate of the issuing CA.

16. The system of claim 15, wherein the software program invokes a recursive subroutine to authenticate the digital certificate of each CA of the chain of CA's.

17. The system of claim 15 wherein the responding step of the software program includes:
   validating the digital signature of the user digital certificate when a timestamp of the respective cache entry is older than a timestamp of the issuing CA; and
   updating the timestamp of the cache entry for the user digital certificate when the digital signature of the user digital certificate is authenticated.

18. The system of claim 15, wherein the of the software program authenticates the issuing CA by:
   validating the digital signature of the digital certificate of each CA of the chain when a timestamp of the corresponding cache entry is older than a timestamp of the cache entry for the corresponding parent CA; and
   updating the timestamp of the corresponding cache entry when the digital signature of the digital certificate of each CA of the chain is authenticated.

19. The system of claim 17, wherein the validating step of the software program includes verifying the digital signature of the user digital certificate using a corresponding public key.

20. The system of claim 18, wherein the authenticating step of the software program includes verifying the digital signature of each CA of the chain using a corresponding public key.

21. The system of claim 15, wherein the verification cache has entries for certificate revocation lists (CRL's), and further wherein the responding step of the software program includes searching a CRL published by the issuing CA when a timestamp of a cache entry for the CRL is more recent than the timestamp of the cache entry for the user digital certificate.

22. A method for maintaining a cache having entries for previously authenticated digital certificates issued by a certification authority (CA) belonging to a hierarchy of CA's, wherein each CA of the hierarchy except a root CA has a corresponding digital certificate issued by a parent CA of the hierarchy, the method comprising the steps of:
   authenticating a digital signature of the digital certificate of one of the CA's when a timestamp of the corresponding cache entry is older than a timestamp of the cache entry for the digital certificate of the corresponding parent CA; and
   updating the timestamp of the cache entry for the authenticated digital certificate when the digital signature is authenticated.

23. The method of claim 22, wherein the cache has cache entries for certificate revocation lists (CRL's) and the authenticating step includes searching a CRL published by the corresponding parent CA when a timestamp of a cache entry for the CRL is more recent than the timestamp of the cache entry for the digital certificate of the CA to be authenticated.

* * * * *

UNITED STATES PATENT AND TRADEMARK OFFICE
CERTIFICATE OF CORRECTION

PATENT NO. : 6,301,658 B1
DATED : October 9, 2001
INVENTOR(S) : Stephen C. Koehler It is certified that error appears in the above-identified patent and that said Letters Patent is hereby corrected as shown below:

<u>Title page,</u>
Item [73], under "Assignee:", delete "MI" and insert -- MN --, therefor.

Signed and Sealed this

Twenty-first Day of May, 2002

Attest:

JAMES E. ROGAN
Attesting Officer  *Director of the United States Patent and Trademark Office*